United States Patent [19]

Hinkle, II

[11] Patent Number: 4,869,831
[45] Date of Patent: Sep. 26, 1989

[54] SEPARATING IMMISCIBLE COMPONENTS FROM TOXIC FLUID

[75] Inventor: Clifford J. Hinkle, II, Destrehan, La.

[73] Assignee: Shell Oil Company, Houston, Tex.

[21] Appl. No.: 112,983

[22] Filed: Oct. 27, 1987

[51] Int. Cl.⁴ .................. B01D 17/00; B01D 21/00
[52] U.S. Cl. .................. 210/744; 210/802; 210/95; 210/86; 210/135; 210/521
[58] Field of Search .............. 210/802, 744, 521, 134, 210/135, 86, 94, 95

[56] References Cited

U.S. PATENT DOCUMENTS

| | | | |
|---|---|---|---|
| 1,513,882 | 11/1924 | Bateman | 210/94 |
| 3,385,439 | 5/1968 | Bach | 210/95 |
| 3,396,846 | 8/1968 | Hamilton | 210/744 |
| 3,398,023 | 1/1964 | Jacobsen | 134/113 |
| 3,467,113 | 9/1969 | Jacobsen | 134/113 |
| 3,623,606 | 11/1971 | Turnridge | 210/94 |
| 3,849,311 | 11/1974 | Jakubek | 210/521 |
| 4,031,007 | 6/1977 | Sierra | 210/86 |
| 4,042,512 | 8/1977 | McCarthy | 210/521 |
| 4,123,365 | 10/1978 | Middlebeek | 210/521 |
| 4,722,800 | 2/1988 | Aymong | 210/521 |

Primary Examiner—Kenneth M. Schor
Assistant Examiner—Thomas M. Lithgow

[57] ABSTRACT

An apparatus and method for controlling operating conditions of a corrugated plate interceptor vessel using at least two transparent windows located in proximity of the oil and treated water layers which are maintained transparent by washing their interior surfaces with a clean fluid such as water.

6 Claims, 2 Drawing Sheets

SEPARATING IMMISCIBLE COMPONENTS FROM TOXIC FLUID

RELATED APPLICATIONS

This application is related to Applicant's copending application Ser. No. 044,072, filed Apr. 29, 1987, now abandoned, which is a Continuation of Ser. No. 911,029 filed on Sept. 24, 1986 now abandoned.

BACKGROUND OF THE INVENTION

This invention relates to separating immiscible components from a fluid containing toxic gaseous materials. More particularly, the invention relates to a process and apparatus for controlling operating conditions for separating the immiscible components of such a fluid without requiring fresh air breathing equipment for personnel or contaminating the atmosphere.

Corrugated plate interceptor vessels for separating immiscible components from fluids, particularly aqueous liquid fluids, are well known in the art. In such processes oil is separated from fluids by flowing the fluid through a group of corrugated plates so that the oil accumulates atop the fluid level and is collected until it overflows an adjustable weir plate and is subsequently disposed.

In a conventional corrugated plate interceptor vessel, hereinafter referred to as a CPI vessel or chamber, doors are provided to be opened by an operator during the separation in order to evaluate the vessel's operation. Since the kinds and amounts of immiscible components contained in the incoming fluids to be separated often undergo significant variations, adjustment in the operating parameters are often needed to obtain and maintain a desired degree of separation. With respect to fluids containing toxic components, such as a sour water stream of wash water from a coking process containing particles of coke and/or coal and dissolved or entrained volatile cyanides, ammonia, benzene, and the like, an observation of how the vessel is operating has heretofore required that an operator put on fresh air breathing equipment and, inevitably, caused contamination of the atmosphere when the doors were opened.

Applicant is not aware of any prior art which, in his judgment as one skilled in this particular art, would anticipate or render obvious the present invention. However, for the purpose of fully developing the background of this invention, and establishing the state of requisite art, the following art is set forth: U.S. Pat. Nos. 4,394,258; 4,309,285; 3,236,095; 2,692,528; 3,398,023; 3,467,113; 3,725,264; 4,186,094 and 4,399,028.

SUMMARY OF THE INVENTION

The present invention relates to an apparatus and method for controlling operating conditions of a corrugated plate separation vessel or chamber while separating immiscible components of a liquid containing toxic gaseous materials without requiring fresh air breathing equipment for personnel or contamination of the atmosphere.

The apparatus of the present invention includes means for introducing the liquid into an oil-water corrugated plate separation chamber to form two portions, a first portion having a horizontal liquid surface level or primarily oil and a second portion having a horizontal surface liquid level of primarily water; at least one transparent window in the wall of the chamber at least near and at least partly above the level of the horizontal surface of primarily oil; at least one transparent window in the wall of the chamber at least near and at least partly above the level of the horizontal surface of primarily water; means for separating the immiscible components of the liquid including a first adjustable weir for controlling the liquid surface level of primarily oil and a second adjustable weir for controlling the liquid surface level of primarily water; means for injecting at least one stream of clear fluid into contact with, and along the interior surface of the windows for maintaining their transparency; means for adjusting the respective rates of flow of liquid into and out of the chamber; and means for adjusting the height of the first and second adjustable weirs to maintain a selected efficiency of separating the immiscible components of the liquid being treated.

The method of the invention includes introducing the liquid into an oil-water corrugated plate separation chamber to form two portions, a first portion having a horizontal liquid surface level of primarily oil and a second portion having a horizontal surface liquid level of primarily water; sealing at least one transparent window in the wall of the chamber at least near and at least partly above the level of the horizontal surface of primarily oil; sealing at least one transparent window in the wall of said chamber at least near and at least partly above the level of the horizontal surface of primarily water; separating the immiscible components of the liquid using a first adjustable weir for controlling the liquid surface level of primarily oil and a second adjustable weir for controlling the liquid surface level of primarily water; injecting at least one stream of clear fluid into contact with, and along the interior surface of the windows for maintaining their transparency; observing the liquid levels while keeping the chamber closed; adjusting the respective rates of flow of liquid into and out of the chamber; and adjusting the height of the first and second adjustable weirs to maintain a selected efficiency of separating the immiscible components of the liquid being treated.

The various features of novelty which characterize the invention are pointed out with particularity in the claims forming a part of this disclosure. For a better understanding of this invention, its operating advantages and specific object obtained by its uses, reference may be made to the accompanying drawings and descriptive matter in which there are illustrated preferred embodiments of the invention.

DESCRIPTION OF THE INVENTION

Figure 1:
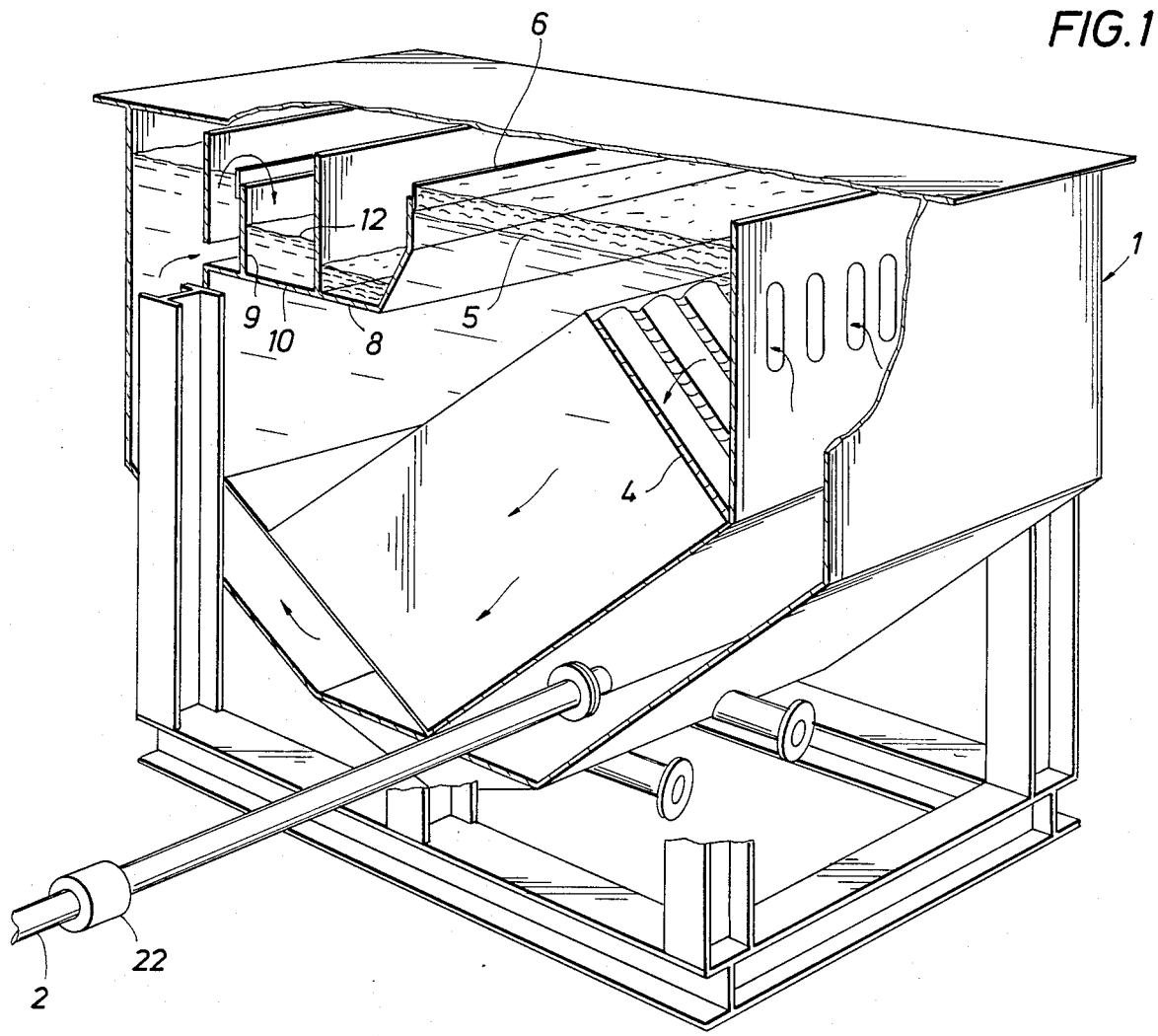
FIG. 1 is a cut-away view of a corrugated plate interceptor vessel.
Figure 3:
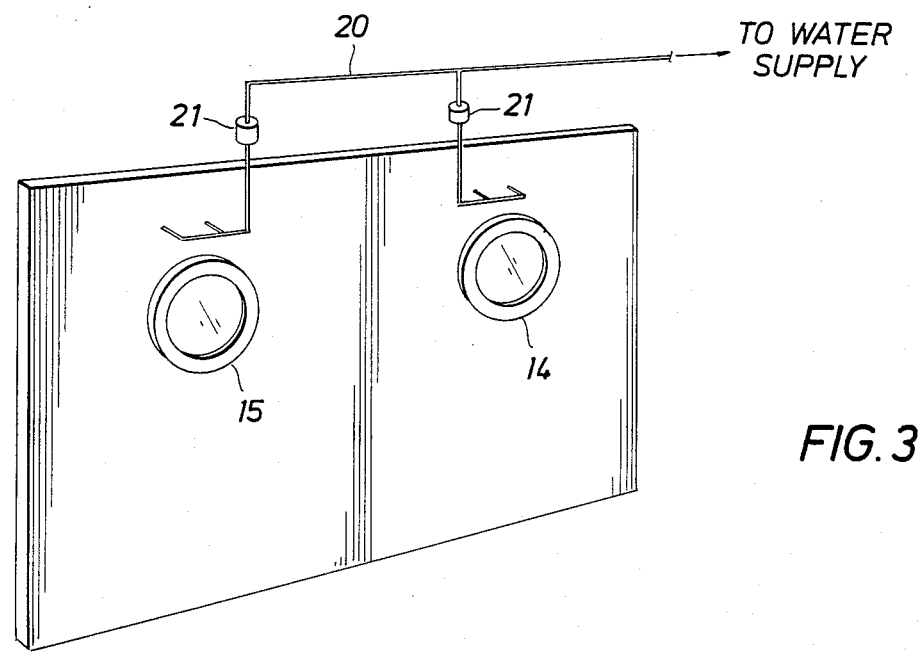
FIGS. 3 and 4 are front and rear views, respectively, of the windows in the wall of the vessel in accordance with the present invention.

FIG. 1 schematically illustrates a conventional corrugated plate interceptor vessel or chamber 1 for separating immiscible components of a liquid containing toxic gaseous materials. The liquid is introduced into the chamber 1 via inlet nozzle 2. The liquid flows upwardly through a slotted distribution baffle 3 and then downwardly through the pack of corrugated plate interceptors 4.

A horizontal liquid level of primarily oil 5 accumulates above the corrugated plate interceptor (CPI) where a thick layer is allowed to collect until it overflows the adjustable weir 6 into a slop oil box 8 for disposal.

Treated water flows upwardly over a second adjustable weir 9 into a clean water collection box 10 to form a horizontal surface liquid level of primarily water 12 which is subsequently disposed.

Figure 2:
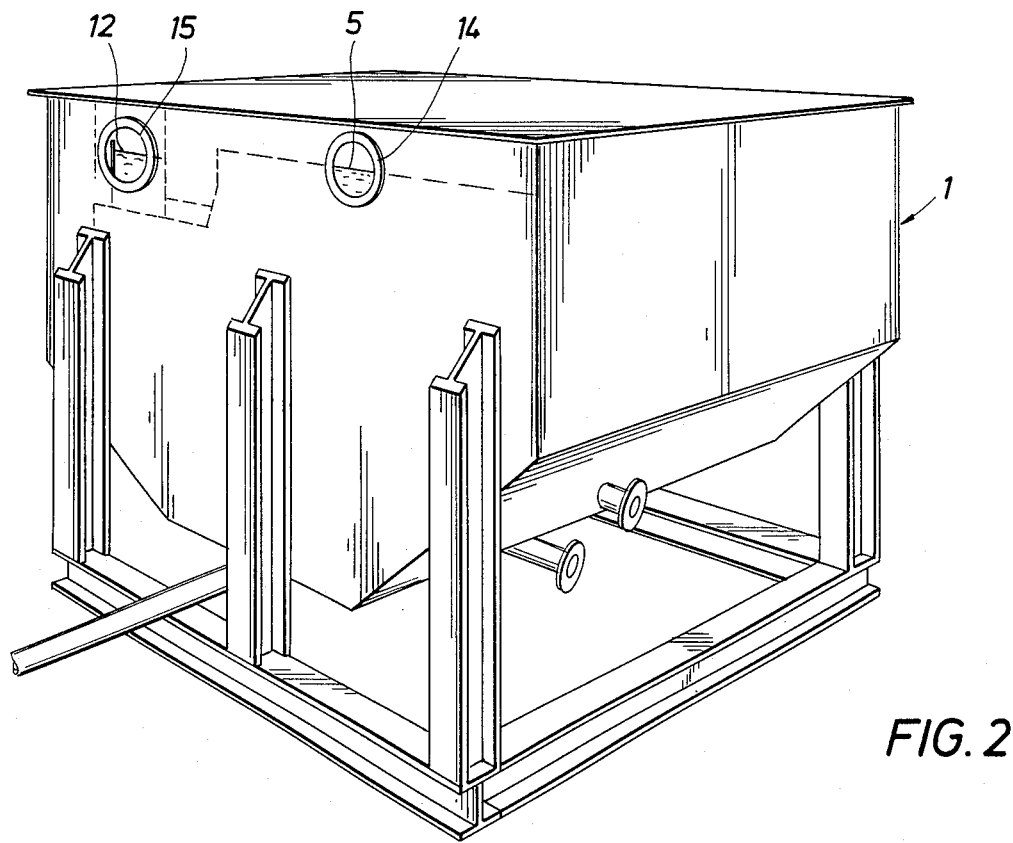
FIG. 2 is a schematic of the vessel illustrating the location of the transparent windows.

FIG. 2 illustrates a front view of a preferred embodiment of the invention relative to separating oily materials from aqueous liquid. At least one transparent window 14 is located in the wall of the chamber 1 at least near and at least partly above the level of the horizontal surface of primarily oil 5. Also, at least one transparent window 15 is located in the wall of the chamber 1 at least near and at least partly above the level of the horizontal surface of primarily water 12. The location of the windows 14 and 15 permit the operator to observe operating conditions of the chamber 1 while keeping the chamber 1 closed and thus, the use of fresh air breathing equipment for personnel and contamination of the environment are avoided.

The windows 14 and 15 can be formed of substantially any impermeable transparent material which is substantially inert to the liquid being treated within the chamber 1. The windows 14 and 15 can be of substantially any shape to provide a view into the interior of the chamber 1.

Where desirable, a light source (not shown) can be mounted to shine light through such a window or mounted within an impermeable transparent shield within the chamber 1 to improve the visibility within the chamber 1.

A water supply line 20 provided with valves 21 is connected between an external water supply system (not shown) and extended through and into the inner side of the chamber 1.

Figure 4:
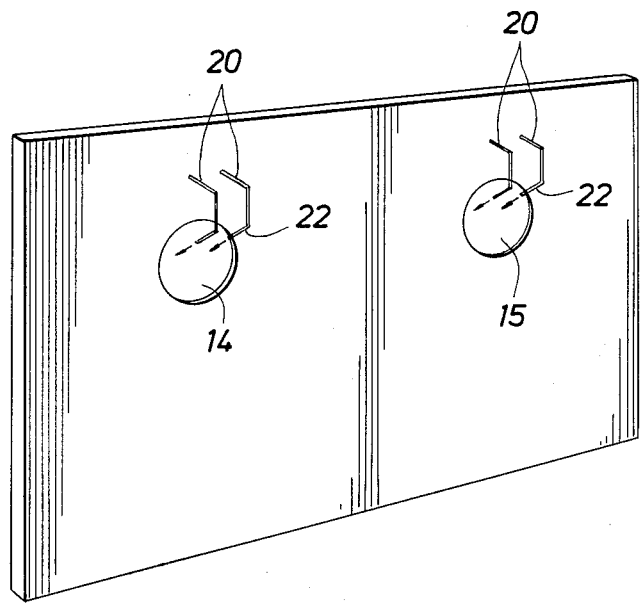

As shown in FIG. 4, the inner portions of the water lines 20 are provided with water washing jets 22 for directing streams of water into contact with, and along the inner side of, the sight windows 14 and 15. In general, the clear fluid flowing over the interior of the sight windows 14 and 15 can be substantially any which is inert with respect to the window surface and adapted to free the window surface of the oil and residual materials within the chamber 1.

In operation, the liquid is introduced to the chamber 1 at a selected rate based on the expected oil content of the liquid to provide a suitable separation of the water and oil. Observations are made through the sight windows 14 and 15 of the horizontal liquid surface levels of primarily oil 5 and water 12. Adjustments can then be made to achieve the desired separation efficiency, such as by adjusting the flow rate of the liquid through the chamber 1 via valve 22 and/or by adjusting the height and/or the level of weirs 6 and 9 in any manner well known to the art. The sight windows 14 and 15 permit observations of the operating conditions of the chamber 1 without any need for opening the chamber 1 and exposing the atmosphere or operator to any of the toxic gas or vapor existing within the chamber.

The foregoing description is merely intended to be explanatory thereof, and various changes in the details of the described method and apparatus may be made within the scope of the appended claims without departing from the spirit of the invention.

What is claimed is:

1. A process for controlling operating conditions while separating immiscible oil and water components of a feed liquid containing said oil and water components and toxic gaseous materials without requiring fresh air breathing equipment for the operating personnel or causing contamination of the atmosphere, comprising:
    adjustably introducing said feed liquid into an oil-water corrugated plate separation chamber having corrugated plate means for separating the oil and water into two portions, a first portion having a horizontal liquid surface level of primarily oil and a second portion having a horizontal surface level of primarily water and wherein said chamber is closed from the atmosphere;
    sealing at least one first window means in a wall of said chamber at a location sufficiently near and at least partly above the level of said horizontal surface of primarily oil for visually observing said level of oil, said first window means being transparent to visible light;
    sealing at least one second window means in said wall of said chamber at a location sufficiently near and at least partly above the level of said horizontal surface of primarily water for visually observing said level of water, said second window means being transparent to visible light;
    separately removing said oil and water components of said liquid from said chamber using a first adjustable weir for controlling said liquid surface level of primarily oil and a second adjustable weir for controlling said liquid surface level of primarily water;
    injecting at least one stream of clear fluid into contact with, and along the interior surface of, said first and second window means for maintaining their transparency to visible light;
    observing said liquid levels while keeping said chamber closed to the atmosphere;
    adjusting the rate of flow of said feed liquid into said chamber; and
    adjusting the height of said first and second adjustable weirs to maintain a selected efficiency of separating the oil and water components of the liquid being treated.

2. The process of claim 1 wherein the feed liquid being treated is an oil-containing sour water liquid.

3. The process of claim 1 wherein the first and second window means are glass windows.

4. The process of claim 1 wherein the clear fluid flowing along the interior surfaces of the first and second window means is water.

5. An apparatus for controlling operating conditions while separating immiscible oil and water components of a feed liquid containing said oil and water components and toxic gaseous materials without requiring fresh air breathing equipment for the operating personnel or causing contamination of the atmosphere, comprising:
    an oil-water separation chamber, said chamber being closed from the atmosphere;
    means for introducing said feed liquid into said chamber and said chamber having corrugated plate means located therein for separating the oil and water into two portions, a first portion having a horizontal liquid surface level of primarily oil and a second portion having a horizontal liquid surface level of primarily water;

at least one first window means in a wall of said chamber at a location sufficiently near and at least partly above the level of the horizontal surface of primarily oil for visually observing said level of oil, said first window means being transparent to visible light;

at least one second window means in said wall of said chamber at a location sufficiently near and at least partly above the level of the horizontal surface of primarily water for visually observing said level of water, said second window means being transparent to visible light;

means for removing said oil and water components of said liquid from said chamber including a first adjustable weir means for controlling said liquid surface level of primarily oil and a second adjustable weir means for controlling said liquid surface level of primarily water;

means for injecting at least one stream of clear fluid into contact with, and along the interior surface of, said first and second window means for maintaining their transparency to visible light;

means for adjusting the rate of flow of said feed liquid into said chamber; and means for adjusting the height of said first and second adjustable weir means to maintain a selected efficiency of separating the oil and water components of the liquid being treated.

6. The apparatus of claim 5 wherein the first and second window means are glass windows.

* * * * *